United States Patent

Aida et al.

[11] Patent Number: 5,232,654
[45] Date of Patent: Aug. 3, 1993

[54] INJECTION MOLDING METHOD FOR MANUFACTURING A THERMOPLASTIC PART FREE FROM SINK MARKS USING A VOID INDUCING MEMBER

[75] Inventors: Hiroshi Aida, Kanagawa; Ryohei Hazawa, Tokyo, both of Japan

[73] Assignee: Nippon Steel Chemical Co., Ltd., Tokyo, Japan

[21] Appl. No.: 805,410

[22] Filed: Dec. 10, 1991

[30] Foreign Application Priority Data

Jan. 14, 1991 [JP] Japan .................................. 3-015939
Apr. 26, 1991 [JP] Japan .................................. 3-123035

[51] Int. Cl.⁵ ............................................ B29C 45/00
[52] U.S. Cl. .................. 264/572; 264/328.8; 264/328.13; 425/542; 425/577
[58] Field of Search .............. 264/572, 328.1, 328.8, 264/328.9, 328.12, 46.6, 50, 328.13; 425/542, 577

[56] References Cited

U.S. PATENT DOCUMENTS

| | | | |
|---|---|---|---|
| 4,685,881 | 8/1987 | Sasaki | 264/572 |
| 5,069,858 | 12/1991 | Hendry | 264/572 |
| 5,080,570 | 1/1992 | Baxi et al. | 264/572 |

FOREIGN PATENT DOCUMENTS

| | | |
|---|---|---|
| 48-41264 | 12/1973 | Japan . |
| 57-14968 | 3/1982 | Japan . |
| 59-176026 | 10/1984 | Japan .................. 264/328.12 |
| 61-9126 | 3/1986 | Japan . |
| 61-53208 | 11/1986 | Japan . |
| 63-268611 | 11/1988 | Japan . |
| 64-63122 | 3/1989 | Japan . |
| 2-13886 | 4/1990 | Japan . |
| 619286 | 3/1949 | United Kingdom . |

*Primary Examiner*—Catherine Timm
*Attorney, Agent, or Firm*—Nikaido, Marmelstein, Murray & Oram

[57] ABSTRACT

When injection-molding a molten thermoplastic resin into a molding having different thicknesses, a void inducing member is set in a cavity corresponding to heavy sections. Then gas pressure is applied passing through a gas passageway to a tip end of the void inducing member, thus forming a void nucleus in the resin adjacent to the tip end of the void inducing member. The void nucleus develops to a void by shrinking force of the resin as the molten resin cools.

4 Claims, 8 Drawing Sheets

FIG.9

| | GAS PRES APPLN PERIOD IN INJECTION CYCLE | APPEARANCE | VOID |
|---|---|---|---|
| | INJECTION → ← DWELLING → ← COOLING → | | |
| EX I | | GOOD | ○ |
| COMP EX(1) | ← NOT APPLIED ------→ | WORSE | × |
| COMP EX (3) | | WORSE | × |
| EX II(1) | | BETTER | ○ |
| EX II(2) | | BETTER | ○ |
| EX III(2) | | BEST | ○ |
| EX IV | | BAD | △~× |

LEGEND ○ : EXIST
× : NOT EXIST
△ : SLIGHTLY EXIST
←—→ : GAS PRES APPLN PERIOD

INJECTION MOLDING METHOD FOR MANUFACTURING A THERMOPLASTIC PART FREE FROM SINK MARKS USING A VOID INDUCING MEMBER

BACKGROUND OF THE INVENTION

The present invention relates to an injection molding method for manufacturing a thermoplastic part with thick and thin wall sections. The method inhibits the formation of surface defects, such as sink marks, which are typically present in such complex parts when manufactured by conventional injection molding method.

In the case of a large-sized part such as a housing for a TV set or a bumper for an automobile, the part must have structural strength as well as excellent surface appearance and dimensional accuracy. In order to obtain structural strength suitable for large parts, it is preferable that the part be designed to include thick wall sections which will reinforce the strength of the part. Hence, the structural integrity of the molded part will not be solely dependent upon the strength of the resin. These conflicting requirements often result in the sacrifice of appearance for strength or vice versa due to the dynamics of the conventional injection molding process.

When a part having both thick and thin wall sections is injection molded, the molten resin in the interior of the mold cavity is cooled and solidified at a slower rate than the exterior surface. Due to this delay of cooling and solidification, the volumetric shrinkage of the resin is likely to be accumulated in the more interior sections of the part. The accumulation of the volumetric shrinkage often causes the formation of sink marks which especially occur on the surface of the thick wall sections, deformations and other defects (which are hereinafter referred to as sink marks) of the part. Consequently, it is difficult to obtain a high quality surface in the molded part.

Due to this phenomenon, in a conventional injection molding process, parts are designed to avoid thick wall sections. When a part with thick wall sections must be manufactured by the conventional injection molding process, a dwelling step immediately after the injection of a molten resin into the cavity of a mold is performed. In the dwelling step, a dwelling pressure is applied to the molten resin existing in the cavity of the mold to maintain the packing density of the injected molten resin. However, when a part has a complicated configuration, a gate sealing precedes the completion of dwelling. As a result, sufficient dwelling pressure cannot be applied to the molten resin at a position far from a gate. The resulting part will not have a satisfactory surface appearance.

Japanese Patent Application Publication 61-53208, Japanese Patent Application Laid Open 63-268611 and Japanese Patent Application Laid Open 64-63122 disclose methods using a high-pressure gas as an auxiliary means of aiding the conventional injection molding process to inhibit the formation of sink marks. These methods comprise a two step process to inhibit surface defects in a molded part. In the first step, the molten resin, in an amount insufficient to fill the cavity of the mold is injected into the cavity. At the same time or after, high-pressure gas is injected into the molten resin to form a hollow portion through a resin flow passage. In the second step, the application of dwelling pressure derived from the high-pressure gas through the hollowed resin flow passage to the interior of the molten resin is maintained so that the molten resin in the cavity is cooled and solidified against the inner wall of the mold to inhibit the formation of surface defects.

However, when a part having a complicated configuration is to be manufactured, the thick wall portion(s) connected with a gate are likely to act as flow leaders for the molten resin, so that the supply of the molten resin to each portion of the mold cavity becomes unbalanced. The result of this unbalance is air traps and flow marks which result in surface defects on the part. In extreme cases, the high-pressure gas may break the surface layer of the solidifying resin part so that the injection molding cycle itself is interrupted and a defective part is manufactured. Moreover, there is a restriction on the design configurations of parts to which these methods are applicable. If a hollow portion sufficient to inhibit the formation of sink marks cannot be formed in the mold cavity, the formation of sink marks on the surface of the part will result. Thus, these methods are not satisfactory for insuring parts with superior surface appearance.

Japanese Patent Publication 48-41264 discloses another injection molding method using high-pressure gas as auxiliary means, when an article having a thick wall throughout the part is to be manufactured. In this method, after molten resin is injected into the cavity of a mold, a gas nozzle is directly projected into the molten resin in the cavity. High-pressure gas is supplied through the gas nozzle into the molten resin to perform the aforementioned first step while forming a hollow portion in the molten resin. This avoids the first step problems enumerated above. However, the configuration of a part to which this method is applicable is limited to uniformly thick wall sections. Moreover, this process requires a reciprocal carrying mechanism for inserting the gas nozzle into the molten resin during injection molding and withdrawing the gas nozzle from the solidified part. This method lacks in practicality, since it requires a driving mechanism with a withdrawing power larger than a constraining force derived from the shrinkage of the resin during solidification t remove the gas nozzle from the part.

Besides, these methods have significant problems such as the danger which accompanies the use and handling of high-pressure gas.

Japanese Patent Publication 61-9126 discloses the method wherein the cavity of a mold is filled with a molten resin, and the thick wall portion of the part is then pressed by a gas pressure from a position corresponding to the back side of the part. However, the direct application of the gas pressure causes the formation of irregular sink marks on the back surface of the part resulting in an unsatisfactory surface appearance.

When a resin such as polycarbonate or polymethylmethacrylate, which set up quickly, is injection molded under conditions that permit the surface layer to rapidly cool and solidify, the formed surface layer of the part exhibits higher strength than the force derived from the volumetric shrinkage of the resin. Consequently, voids are formed in the thick wall portion of the part without deformation of the surface layer. In this case, sink marks are not formed on the surface of the thick wall portion.

The formation of these internal voids is regarded as a defect which causes a reduction of the strength in the part. However, this phenomenon of forming voids can be effectively controlled to inhibit the formation of sink marks, as disclosed in Japanese Patent Application Publication 2-13886. In this method, a void control member is projected through the inner surface of a mold into the cavity where sink marks are apt to form on the surface of the part. The void control member promotes the formation of a void in the resin body near the top end of the void control member, thereby inhibiting the formation of sink marks. This method has the advantage that the formation of sink marks can be inhibited by a simple, economical means.

However, the void control means must be made of a material having large heat capacity, so as to be held at a higher temperature in order to spontaneously form voids. Consequently, it is difficult to make the void control members smaller in size. The position where the void control members may be located in the mold are restricted, and the void control members cannot be held at a high temperature under a stable condition. As a result, it is difficult to ensure the thick wall sections of the part will be free of sink marks.

In addition, the positions where sink marks will be likely to be formed are irregularly affected by the molding conditions. For instance, the sink marks are formed at different positions during every molding cycle, even when the same part is manufactured. In this regard, it is difficult to predetermine the position where sink marks will b formed. The size and the configuration of the thick wall portion has an influence on the positions where sink marks are to be formed as well. Furthermore, in some resins, such as polycetal, the voids do not expand to the extent sufficient to compensate for the volumetric shrinkage of the resin, so that the formation of sink marks on the surface of a part cannot be completely eliminated.

An object of the present invention is to overcome the above-mentioned problems which causes defects in a molded part, and to obtain a molded part with excellent surface appearance, free from sink marks, even when the part has wall sections that vary significantly in thickness.

The present invention to realize the above-mentioned object is to induce a void in the portion near the top end of a void inducing member provided at position of each thick wall portion by the application of a gas pressure along the void inducing member, and then to make the void larger by the shrinkage force of the resin, without using a high-pressure gas which causes various defects. The present invention provides an injection molding method for manufacturing a thermoplastic part having thick and thin wall portions while inhibiting the formation of sink marks on the surface of the part. The steps in this process are:

1. providing at least one void inducing member having an acute top end at a position, corresponding to a thick wall portion where sink marks will be easily formed in a state that the acute top end is located in the cavity of the mold, 2. injecting molten resin in an amount sufficient to fill the cavity of the mold, 3. supplying compressed gas along the periphery of the void inducing member to the acute top end, wherein a resin skin layer is formed in contact with the top end of the void inducing member and is penetrated by the compressed gas, and one fine bubble serving as a void nucleus is formed in the molten resin, and 4. cooling and solidifying the resin, such that the void nucleus is expanded to a large void in response to the volumetric shrinkage of the resin by the shrinkage force of the resin during cooling and solidification.

The application of the gas pressure may be started just after the completion of the resin injection into the cavity of the mold or may be started after the dwelling step wherein the thermoplastic resin injected to fill the mold cavity is held at a predetermined pressure for a predetermined period. In this dwelling process, the molten resin is circulated to all parts of the mold cavity and the counter flow of the injected resin from the cavity to reduce the packing density is also inhibited.

After the void nucleus is formed in the molten resin at an inner part near the top end of the void inducing member by the application of the gas pressure, the application of the gas pressure to the void nucleus may be continued until the molten resin, at the part corresponding to the thick wall portion, loses its fluidity. Thereby, the shrinkage force of the molten resin during cooling and solidification effectively promotes the growth of the void nucleus up to a volume sufficiently corresponding to the volumetric shrinkage of the resin.

The mold to be used in this method has a cavity, comprising at least one large space, corresponding to the configuration of the part to be manufactured. The void inducing member is located in the cavity in such a manner that its acute top end is projected into the large space from the inner surface of the mold cavity. The void inducing member has a passage extending longitudinally along its surface for introducing the compressed gas. The void inducing member has the form of a simple pin, and is secured to the mold in the same manner that of other pins. The void inducing member can, thereby, be easily prepared and incorporated in the mold. In addition, the void inducing member may be used as a core pin of a sleeve ejector for ejecting the sleeve of the part from the mold.

The mold cavity is filled with molten resin, and then the gas pressure is applied to the molten resin along the periphery of the void inducing member projected into the mold cavity immediately after the resin injection or after the completion of the dwelling step. When the interior of the molten resin reaches a negative pressure owing to the volumetric shrinkage of the molten resin during cooling and solidification, the compressed gas breaks through the skin layer of the resin being formed around the acute top end of the void inducing member and a fine bubble is induced in the molten resin. The bubble acts as the void nucleus for the formation of the void. The pressure of the compressed gas which is applied is much lower than the above-mentioned conventional methods using high-pressure gas, since the interior of the molten resin is at the negative pressure and the resin skin layer near the top end of the void inducing member is still thin.

Once the void nucleus is formed, a volumetric shrinkage force derived from the cooling and solidification of the resin near the void inducing member is accumulated as negative pressure in the void nucleus, even if the application of the gas pressure is stopped. Consequently, the void nucleus acts as a seed for the growth of the void, and the void continuously becomes larger in volume while introducing the atmospheric gas through a hole formed at the top end of the void inducing member to compensate for the volumetric shrinkage of the resin. Thus, the function of the void to inhibit the formation of sink marks extends not only to the portion of the part near the void inducing member but also to the entire thick wall portion of the part. When the application of the gas pressure is continued, the gas pressure in combination with the volumetric shrinkage force of the resin effectively promote the growth of the void even though the compressed gas is being supplied at a very low pressure. Consequently, the formation of sink marks can be inhibited not only at the thick wall portion but also at an adjacent thick wall portion and at a thin wall portion near the thick wall portion.

The void inducing member has the acute top end which facilitates an accumulation of the gas pressure near the top end of the void inducing member to make the formation of the void nucleus easy. Owing to the acute top end, the formation of the void at a position in the resin can be reproduced with high reliability.

It is not necessary to increase the heat capacity of the void inducing member. On the contrary, the acute tip of the void inducing member has a small heat capacity.

The diameter of the void inducing member is not limited in particular, but preferably 1 to 5 mm to ensure the mechanical strength of the part. Where the acute top end of the void inducing member is inserted into the large space of the mold cavity, it is not necessary to locate the top end at the center of the large space. The projection of the void inducing member from the inner surface of the mold may be shorter in length similar to the diameter of the void inducing member. Consequently, the formation of the skin layer near the top end of the void inducing member is retarded, and the skin layer is held in a state which is easy to penetrate by the application of the gas pressure.

The resulting hole formed in the skin layer is very small in diameter, e.g. 0.5 mm or so, which is barely visible. Consequently, the appearance of the part is not effected by the formation of the hole.

The position for providing the void inducing member is not limited in particular, but may be located any place convenient with respect to the design of the mold. For instance, a sufficient effect is obtained even when the void inducing member is located near the circumference of the large space.

Consequently, the degree of freedom in designing a part is considerably greater than with the void control member disclosed in Japanese Patent Publication 2-13886. In addition, the void inducing member may have any configuration other than a column, as far as the gas pressure can be applied to the part of the resin near the top end of the void inducing member.

The pressure of the compressed gas to be applied is about 5 to 15 kg/cm$^2$, which is much lower than that of high-pressure gas used as an auxiliary means in the conventional methods. For instance, the conventional injection molding methods using high-pressure gas disclosed in Japanese Patent Publication 57-14968 and Japanese Patent Publication 61-53208 use high-pressure gas compressed up to 150 kg/cm$^2$ for hollowing the thick wall portion. In the present invention, an air pressure of 10 kg/cm$^2$ or less will be sufficient in most cases, so that an ordinary gas supply source is usable. The gas flows along the periphery of the void inducing member and reaches the top end of the void inducing member, so that a slight gap is formed between the surface of the void inducing member and the resin skin layer. The slight gap acts as a gas passage to introduce the atmospheric gas into the void after the supply of compressed gas is stopped. As a result, the void inducing member can easily be extracted from the part, since the void inducing member is not captured by the part different from the method disclosed in Japanese Patent Publication 48-41264. Thus, it should be recognized that the method utilized in the present invention attains superior results over the other known methods.

The other objects and features of the present invention will be understood from the following description with reference to the drawings attached.

BRIEF DESCRIPTION OF THE DRAWINGS

FIG. 9 is a table summarizing the results of examples.

DETAILED DESCRIPTION OF THE PREFERRED EMBODIMENTS

The type of resin to be used for injection molding according to the present invention is not precisely defined. Any type of a thermoplastic resin such as polystyrene, polypropylene, ABS or polycarbonate, as well as a mineral or glass reinforced thermoplastic resin may be used. The present invention is particularly effective when applied to resins having large shrinkage rates, such as polypropylene or ABS. In these instances, the void inducing member effectively demonstrates its function to eliminate the formation of sink marks.

The void inducing member is located at the position corresponding to the thick wall portion of the part to be molded. When the thick wall portion is so large in size that the volumetric shrinkage of the entire thick wall portion cannot be absorbed by the formation of a void at one position, multiple void inducing members are arranged at proper intervals. The distance between adjacent void inducing members is determined by the relationship of the volume of the thick wall portion whose volumetric shrinkage can be compensated by the void originated by one void inducing member. In practice, enough void inducing members are arranged to offset the influence of molding conditions, especially the temperature of the resin, on the formation of the void.

Figure 1:
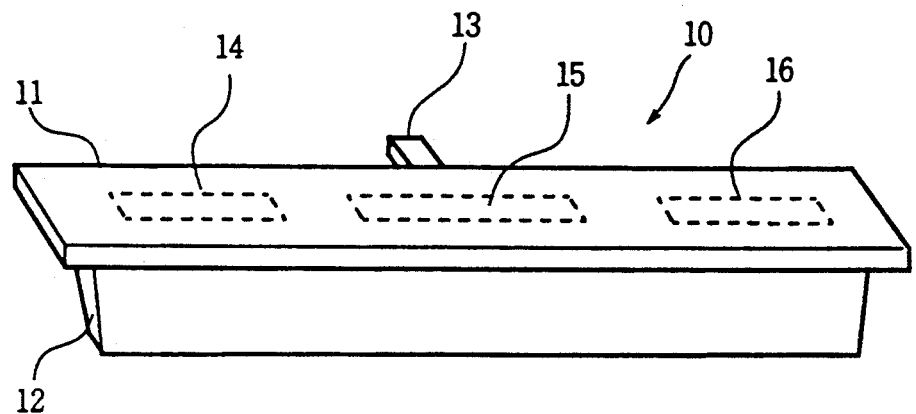
FIG. 1 is a perspective view showing the whole body of a part obtained in an example.

A part having, for example, the configuration shown in FIG. 1 may be manufactured utilizing the present invention. The part (10) comprises a plate (11) as a thin wall portion and a rib (12) as a thick wall portion. A gate (13) formed by the sprue of a mold remains attached to the side surface of the plate (11). The gate (13) is cut off to obtain the finished part (10). The plate (11) may have, for example, a thickness of 3 mm, while the rib (12) has a thickness of 10 mm. Since the rib (12) has the greater thickness, sink marks are likely to be formed at surface portion (14, 15 and 16) of the rib (12) when the part (10) is manufactured by conventional injection molding methods.

Figure 2:
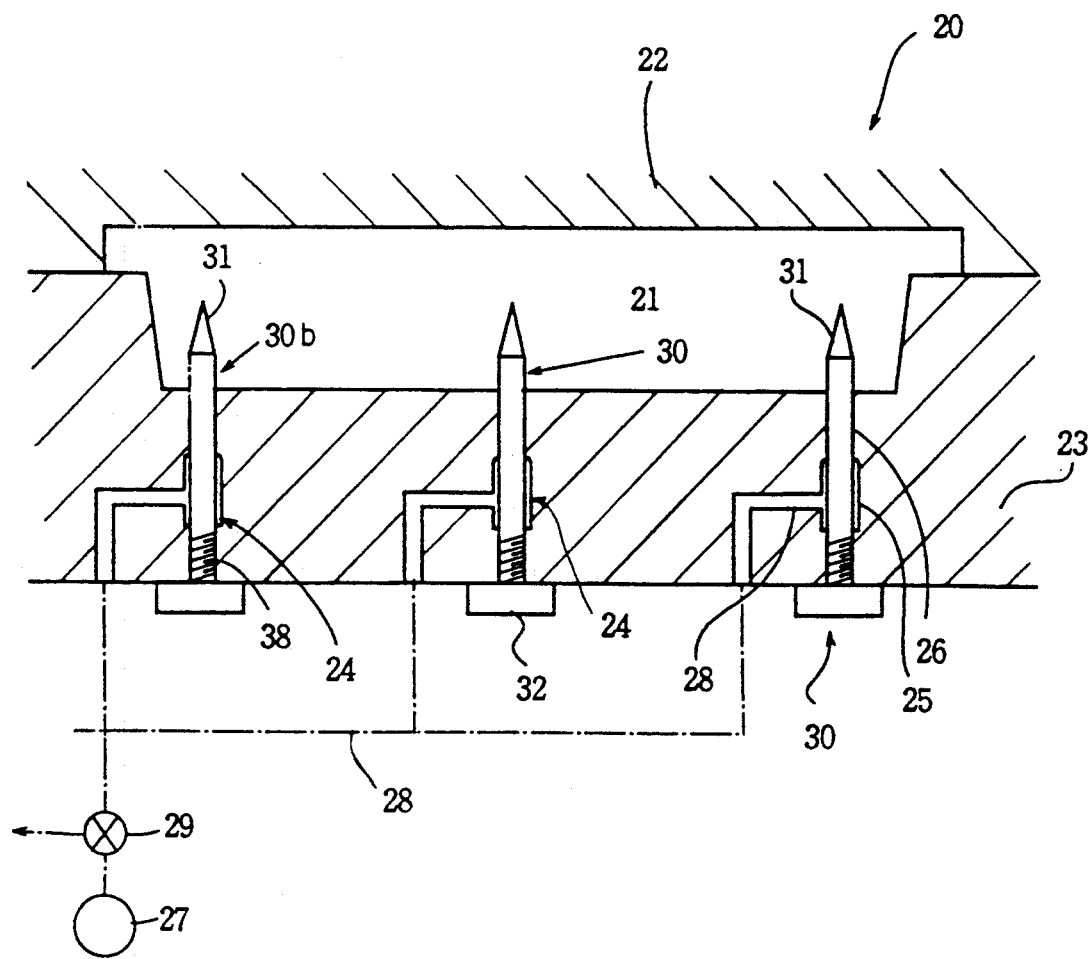
FIG. 2 is a sectional side view of a metal die to be used in the present invention.

A mold utilizing the present invention has the structure shown in FIG. 2. The mold (20) is comprised of a stationary part (22) and a movable part (23). The movable part (23) is clamped to the stationary part (22) to form a cavity (21) therebetween. A gate is positioned to permit injection of molten resin into the mold (20).

Void inducing members (30) ar placed to pass through the wall of the movable part (23). Each void inducing member (30) is in the form of a pin comprising an acute tip (31), a pin body (30b), a screw thread (38) and a flange (32). The void inducing member (30) is projected into the cavity (21) through a hole (24) formed in the movable part (23). The screw thread (38) is fixed in the movable part (23). The flange (32) is held in contact with the outside surface of the movable part (23). The top end of the acute tip (31), projecting from the inner surface of the movable part (23), is located at the central portion of the cavity (21).

The hole (24 formed through the wall of the movable part (23) comprises a large diameter portion (25) and a small diameter portion (26). The base portion of the void inducing member (30) is surrounded with the large diameter portion (25), which is connected with a compressed gas supply source (27) through a conduit (28) and a valve (29). The small diameter portion (26) is slightly larger in diameter than the void inducing member (30) to form an annular passage for compressed gas around the small diameter portion (26).

Figure 3:
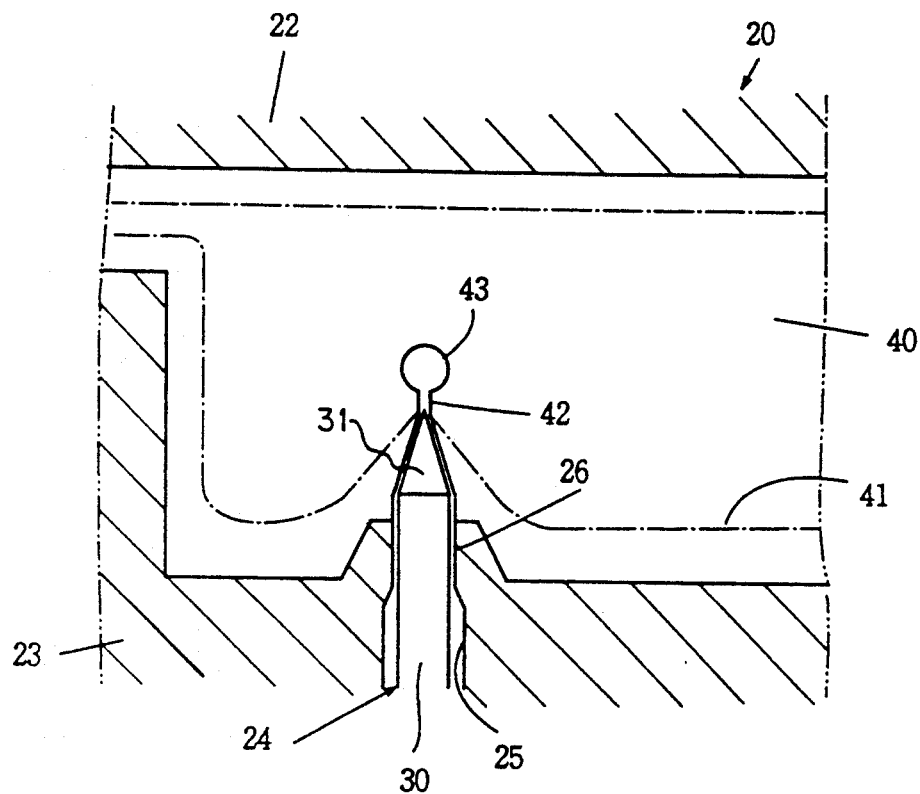
FIG. 3 is a sectional view for explaining the formation of a void nucleus.

Molten resin (40) is injected into a cavity (21) of the mold (20) by an injection molding machine in order to fill the cavity of the mold (20), as shown in FIG. 3.

Immediately after the cavity (21) is filled with a molten resin (40), the valve (29) is opened to supply compressed gas from the ga supply source (27) through the conduit (28) to the holes (24). Since the compressed gas is used at ambient temperature and is supplied at a relatively low pressure, the compressed gas does not have any harmful influence on the part, such as oxidation, which may effect surface finish. In this regard, the use of compressed air is most advantageous from a cost and handling perspective. When the molten resin being cooled begins its volumetric shrinkage, the compressed gas supplied from the gas supply source (27) flows through a clearance between the small diameter portion (26) and the surface of the void inducing member (30), and reaches the top end of the void inducing member (30). The compressed gas is peeling off a resin skin layer (41) being formed around the acute tip (31) of the void inducing member (30), and the pressure of the compressed gas is concentrated at one point near the top end of the void inducing acute tip (31), as shown in FIG. 3. Since the cooling of the skin layer (41) is slower at a position nearer to the top end of the void inducing member (30), the skin layer (41) near the top end is maintained in a thinner state. Consequently, the compressed gas easily breaks through the thin skin layer (41) near the top end of the acute tip (31) and forms a hole (42) in the skin layer (41). The projection of the void inducing member (30) from the inner surface of the mold (20) is nearly similar in length to the diameter of the void inducing member (30). The volumetric shrinkage force generated in the resin body promotes the introduction of fine bubble from the outside through the hole (42) into the molten resin (40), thereby forming a void nucleus (43) serving as a seed for the growth of a void (44).

The application of the gas pressure may be stopped at this point. At the same time, the gas passage between the valve (29) and the surface of the resin body is communicated with the atmosphere, so that the residual gas is released from the gas passage to the atmosphere.

The compressed gas is not necessarily released. Since the continuation of the application of gas pressure in combination with the volumetric shrinkage of the resin body accelerates the growth of the void, the formation of sink marks can be inhibited not only at the thick wall portion but also at an adjacent thick wall portion and at a thin wall portion near the thick wall portion of the molded part.

Figure 4:
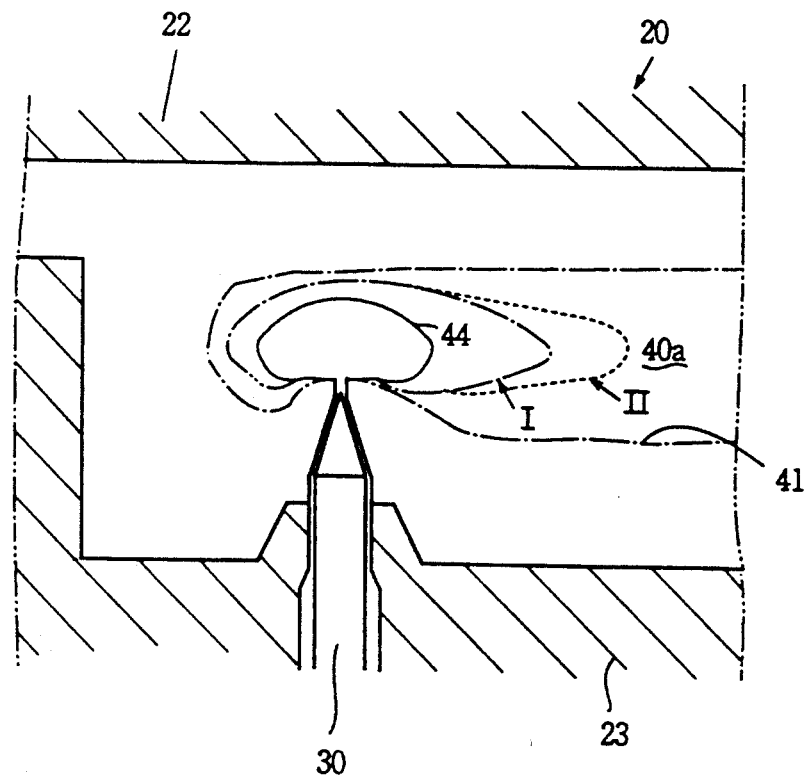
FIG. 4 is a sectional view for explaining the growth of a void.

As the resin (40) is cooled and solidified, the void nucleus (43) expands to a void (44) by the shrinkage force of the resin (40), as shown in FIG. 4. The void (44) increases in size as shown in reference I to II in the direction of the resin (40a) remaining in a molten state because of the delay in cooling and solidification. The growth of the void (44) is accompanied by the circulation of the molten resin near the void (44) and the surface enlargement of the void (44). When the viscosity of the molten resin increases as cooling process advances, the resistance of the resin to the circulation and the surface tension becomes balanced with the volumetric shrinkage force. As a result, the growth of the void (44) is stopped. In this regard, the continuation of the gas pressure application is effective until the molten resin loses its fluidity. After the resin (40) is completely solidified, the mold (20) is opened to remove a molded part.

The molded part has a configuration which corresponds to the cavity of the mold with a smooth surface free from sink marks at the surface portions most likely to encounter surface defects (14 to 16) since the volumetric shrinkage of the resin (40) is offset by the growth of the void (44).

Figure 6:
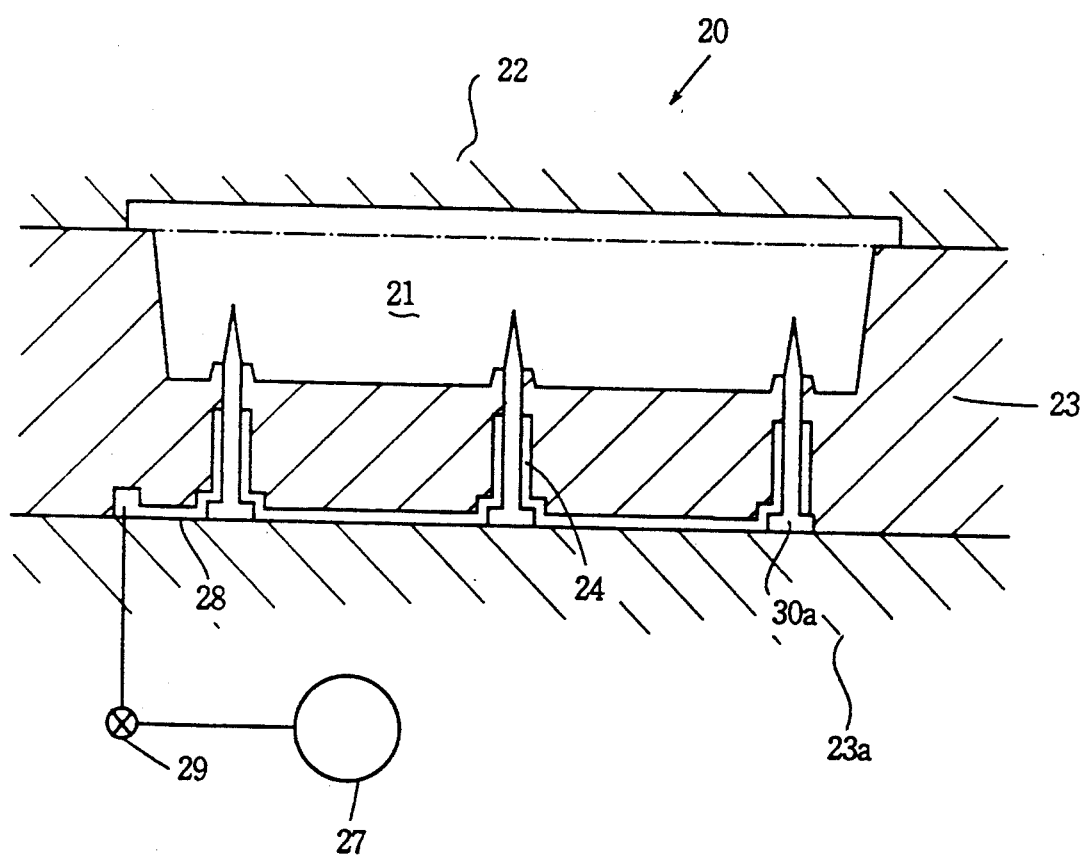
FIG. 6 is a sectional view showing another example of a mold.

The mold (20) may have a holding plate (23a) in addition to the stationary part (22) and the movable part (23), as shown in FIG. 6. The holding plate (23a) is fixed to the movable part (23), and each void inducing member (30a) is secured to the movable part (23). A conduit (28) for applying gas pressure is formed between the movable part (23) and the holding plate (23a), and connected with each hole (24). The void inducing members (30a) have the same function as the void inducing member (30) shown in FIG. 2.

Figure 5:
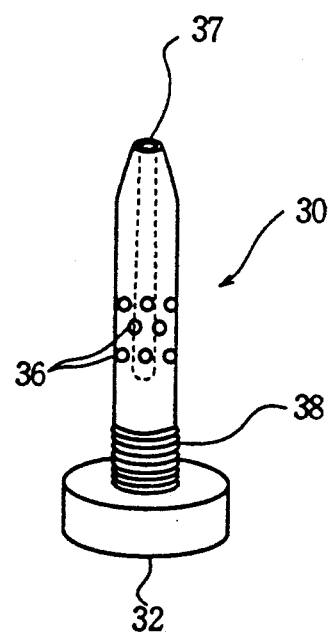
FIG. 5 is a perspective view of another example of a void inducing member.

FIG. 5 shows another example of the void inducing member (30). This void inducing member (30) has an axial hole (37) and a plurality of lateral holes (36). The lateral holes (36) are communicated with the axial hole (37) and with the large diameter portion (25) of the hole (24) shown in FIGS. 2 and 3. In this example, gas supplied from the source (27) flows through the lateral holes (24) into the axial hole (37), and then spouts from the opening of the top end of the void inducing member (30). Consequently, a void nucleus is formed in the resin.

Figure 11:
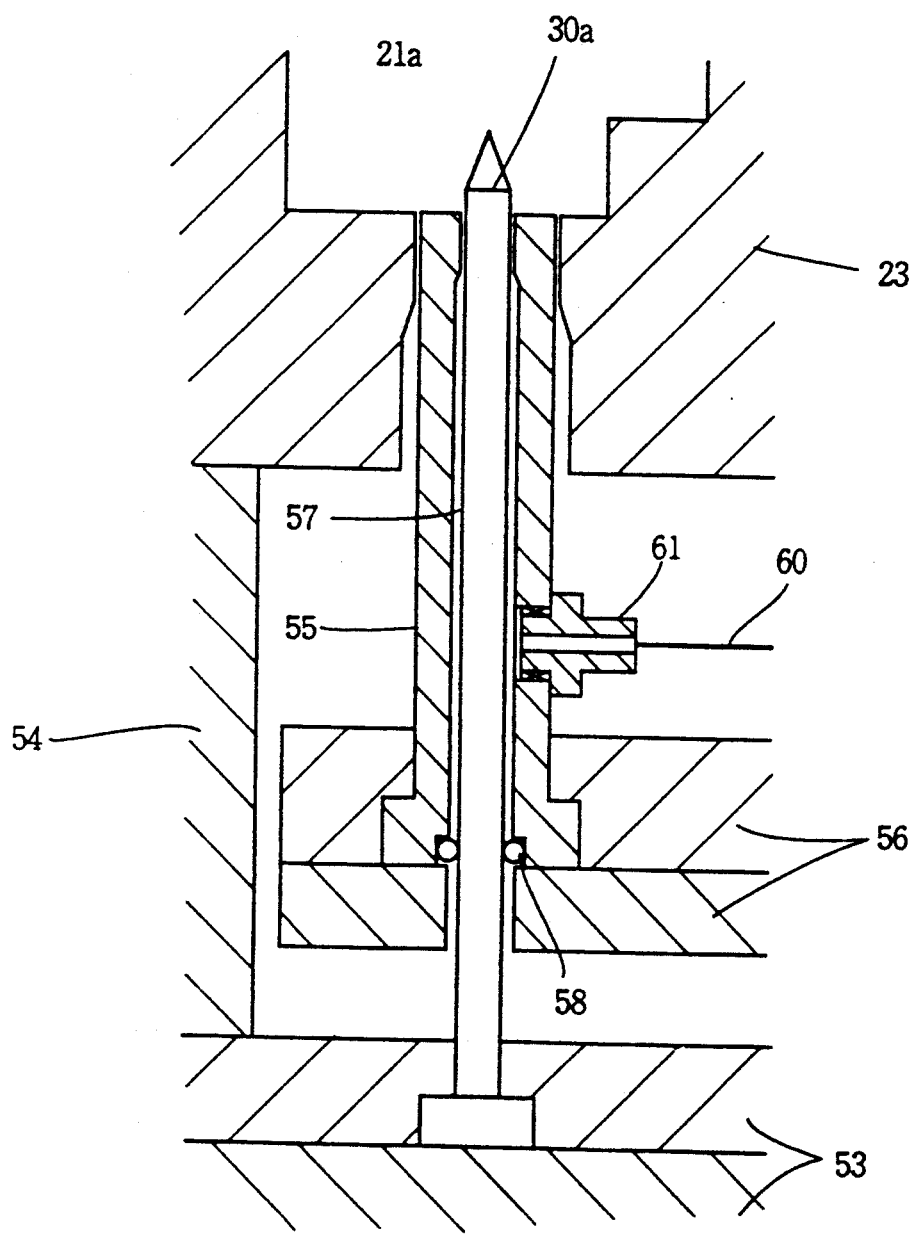
FIG. 11 is a sectional view showing the means for attaching a void inducing member used as sleeve ejection.

A void inducing member may be also placed at the optional position of the mold using an attaching device shown in FIG. 11. This void inducing member (30a) is mounted to a bottom plate (53) secured to a movable part (23) through a spacer block (54). The void inducing member (30a) is inserted through a sleeve (55) supported by an ejector plate (56). A gas passage (57) formed between the void inducing member (30a) and the sleeve (55) is connected with the top end of the void inducing member (30a) projecting into the cavity (21a) from the inner surface of the movable part (23), and sealed by an O-ring (58) at the bottom. Compressed gas is supplied to the top end of the void inducing member (30a) through the conduit (60), a connector (61) and the passage (57).

This device facilitates the attachment of the void inducing member (30a), even at a position where it is difficult to attache the void inducing member by some other type of device. The attachment device is a simple mechanism which is easy to construct. In addition, the sleeve (55) may also act as an ejector for extracting a molded part from the mold. As a result, the mold assembly can be prepared at a low cost.

EXAMPLE I

A molded part having the configuration shown in FIG. 1 was obtained by injection molding using the mold shown in FIG. 2. The plate (11) of the part (10) was 3 mm in thickness, while the rib (12) was 230 mm in length and 10 mm in thickness. Three void inducing members (30) were incorporated at intervals of 100 mm in the movable part (23) of the mold (20). Each void inducing member (30) was of 2 mm in diameter.

The smaller diameter portion (26) located near the cavity (21) was slightly larger in diameter than the cross section of the void inducing member (30), to form a narrow annular gap between the inner surface of the smaller diameter portion (26) and the periphery of the void inducing member (30). The narrow annular gap was sized to inhibit the inflow of the molten resin being injected into the cavity (21) of the mold (20).

Molten polystyrene was injected into the cavity (21) of the mold (20) and then held for 3 seconds at a dwelling pressure. Immediately thereafter, compressed air of 9.5 kg/cm$^2$ at an ambient temperature was supplied from the compressed gas supply source (27) through the conduit (28) to the top end of each void inducing member (30). The application of the gas pressure to the resin (40) near the top end of each void inducing member (30) was continued for 8 seconds. The compressed air was then discharged to the atmosphere by opening the valve (29). After cooling for 60 seconds, the molded part was removed from the mold (20).

The part had a smooth surface, and no defects such as sink marks were detected on the surface of the part. A hole of approximately 0.5 mm in diameter was found at the part where the top end of each void inducing member (30) was inserted into the resin body. The formation of voids inside the part was detected at each portion inside the hole. Each void was relatively large in volume. However, the surface appearance of the resin part was not harmed by these holes and voids.

COMPARATIVE EXAMPLES (1) TO (3)

The following experiments were carried out in order to verify the effectiveness of the present invention.

(1) Polystyrene was injection molded using the mold shown in FIG. 2, under the same conditions as Example I without the application of a gas pressure. In this case, no void was formed in the molded part near the top end of each void inducing member (30). The molded part was inferior in surface appearance. Many sink marks were formed on the surface of the part at locations corresponding to the rib (12) and on the side surface of the part.

(2) A cylindrical pin made of steel (SK-4) having a diameter of 6 mm, as disclosed in Japanese Patent Publication 2-13886, was used as a void control member. Polystyrene was injection molded under the same conditions as Example 1 but using the void control member instead of the void inducing member. In this case, no void was formed. However, many sink marks were detected on the surface of the molded part. Consequently, the part was inferior in surface appearance. Other resins such as ABS, polycarbonate and PMMA were used in addition to polystyrene, and the results were the same.

(3) The compressed gas was applied to molten resin (40) injected into the cavity (21) of the mold (20) for 3 seconds during the dwelling step under the same conditions as those in the Example I. At the completion of dwelling, the supply of the compressed gas was stopped, and the gas was discharged through the valve (29) to the atmosphere. The injected polystyrene was cooled and solidified with the conduit (28) for the circulation of the compressed gas being opened to the atmosphere. In this case, no void was formed in the molded part, and many sink marks were detected on the surface of the part. Again, the molded part was inferior in surface appearance.

In another experiment, the application of gas pressure was continued from resin injection through a dwelling step under the same conditions as Example 1. The supply of the compressed gas was stopped at the beginning of the cooling step. When the polystyrene was cooled and solidified under this condition, the formation of sink marks was detected on the surface of the molded part. The part had a poor surface appearance.

EXAMPLE II (1)-(2)

(1) Injection molding was performed under the same conditions as the Example 1, but the time period of application of gas pressure to the injected resin during the cooling step was changed in each experiment to investigate the influence of the gas pressure application time on the size of the void formed in the part.

Figure 7:
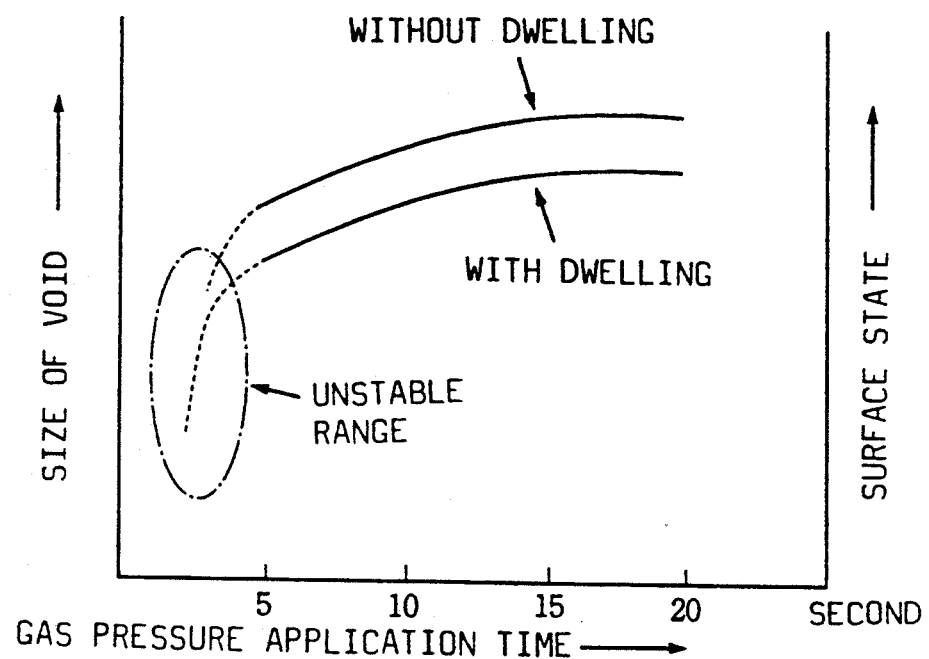
FIG. 7 is a graph showing the influence of gas pressure application time on the size of a void and the surface appearance of a part.

The results are shown in FIG. 7. It was observed that the formation of the void nucleus began within 5 seconds of the start of application of the gas pressure. It was also observed that the growth of the void was enhanced when the application of gas pressure was continued after the formation of the void nucleus. When the surface appearance of the part was examined in detail, it was observed that the volume of the void had a proportional relationship with the improvement of the surface appearance of the part.

(2) In order to begin the formation of the void at the earliest possible time and to synchronize the growing speed of a solidified resin layer with the growing speed of the void, the application of the gaseous pressure was started immediately after the cavity (21) of the mold (20) was completely filled with molten polystyrene without being held in the dwelled state. Owing to the earlier start of the gas pressure application, the void grew larger in volume than the void with dwelling, and the surface appearance of a part was further improved. Thus, it was recognized that the dwelling was not necessarily required.

The weight of the part with the dwelling was 133.9 g, while the weight without dwelling was 131.2 g. By contrast, the application of the gas pressure did not make any substantial change in weight of the part.

EXAMPLE III (1)–(3)

(1) A part having a configuration similar to that of the part in Example I (see FIG. 1) was utilized in Example III. The part had a rib (12) formed at the central surface of the back side of a plate (11). The plate (11) was 2 mm in thickness, while the rib (12) was 6 mm in thickness and 230 mm in length. The rib (12) had a thick wall portion considerably smaller in thickness than that of the Example I. When this part was manufactured by conventional injection molding, many sink marks were formed on the surface portions (14–16) of the plate (11) corresponding to the rib (12). In order to inhibit the formation of sink marks, three void inducing members were incorporated at intervals of 100 mm in the movable part (23) of the mold (20). Each void inducing member (30) had a diameter of 2 mm.

Injection molding was performed using this mold (20), while setting the cooling time at 40 seconds. The other conditions were the same as those in the Example I. A hole of approximately 0.5 mm in diameter was formed in the part at a location corresponding to the top end of each void inducing member. The formation of a void connected with each hole was observed in the part. When the surface appearance of the part was observed, no defects such as sink marks were detected, as in the case of the Example I.

(2) In another embodiment, the gas pressure was applied only to the left-side void inducing member (30) of FIG. 2 but not to the center and right-side void inducing members. The other molding conditions were held constant with Example I. In this case, the part had the surface portions (14 and 15) free from sink marks, while the formation of some sink marks was detected on the other surface portion (16).

(3) The application of the gas pressure was continued until the end of the cooling period, while omitting the dwelling step. The other molding conditions were held constant. No sink marks were detected in the part on the surface portion (16) or the other surface portions (14 and 15).

EXAMPLE IV

Figure 8:
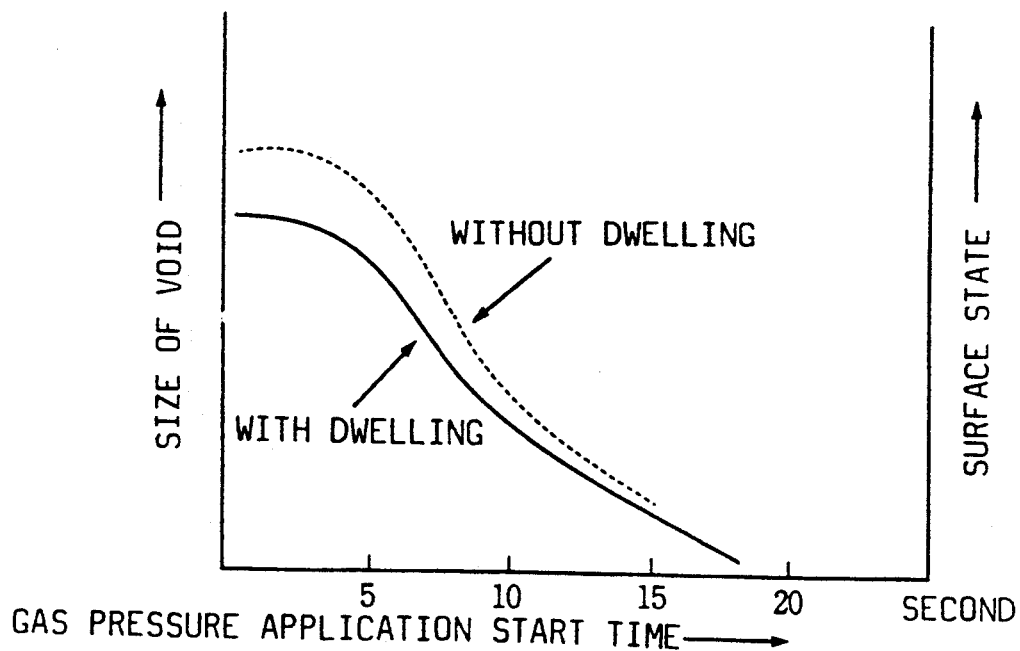
FIG. 8 is a graph showing the influence of timing on the application of gas pressure on the size of a void and the surface appearance of a part.

In the Examples I and III, the gas pressure was applied to the top end of the void inducing member immediately after the cooling period started. In Example IV, the application of the gas pressure was delayed by different time periods after the cooling period started. The relationship of the delay time with the volume of the formed voids and the surface appearance of the part was compared under the same conditions as those in the Example II. The results are shown in FIG. 8. It should be noted that the volumetric shrinkage of the resin causing the formation of sink marks was insufficiently compensated by the growth of the voids, when the growth of a solidified resin layer preceded that of the voids. Consequently, the surface appearance of the part was only partially improved.

The results in the Examples I through IV and the Comparative Examples are summarized in FIG. 9.

EXAMPLE V

Figure 10:
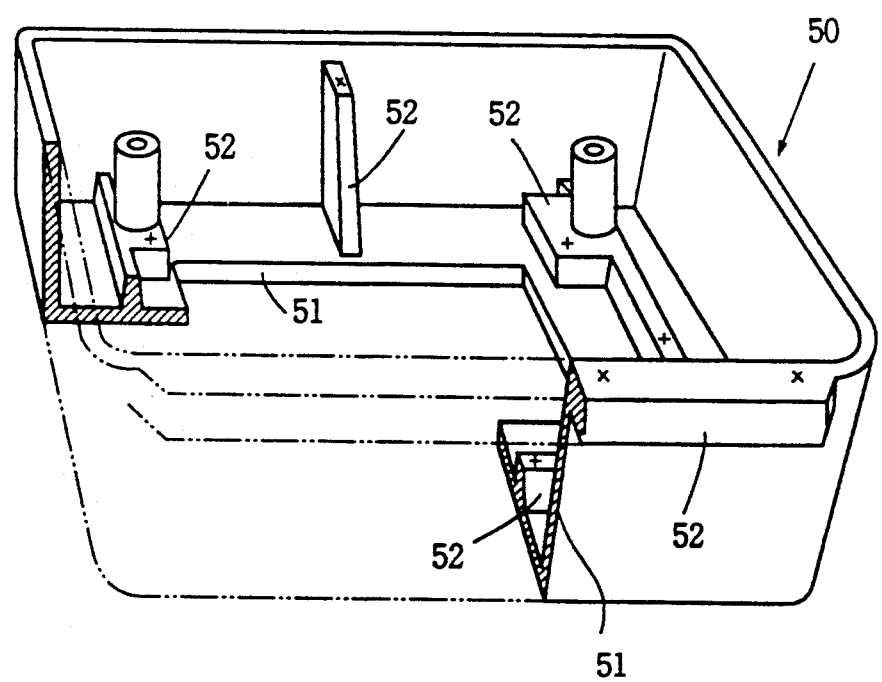
FIG. 10 is a perspective view showing the entire body of a part obtained in another example.

A part having a complicated configuration shown in FIG. 10 was utilized in Example V. The part had thin wall portions (51) and thick wall portions (52) variously different in thickness from each other. When such a part was injection molded, many void inducing members were inserted into the cavity through the wall of a mold at positions corresponding to the parts indicated by the marks × and +. A void inducing member was set at each part designated by the mark x by the attaching device shown in FIG. 11, while another void inducing member was set at each part designated by the mark + using the holding plate (23a).

After the cavity of the mold was filled with molten resin, gas pressure was immediately applied to the molten resin. The part was ejected from the mold after being cooled and solidified.

The part had excellent surface appearance without the defects such as sink marks on its surface, despite its complicated configuration.

In accordance with the present invention, at least one void inducing member is provided at the position of the mold corresponding to each thick wall portion of the part. After the cavity of the mold is filled with molten resin, compressed gas is supplied to the top end along the periphery of the void inducing member. The skin layer being formed near the tip end of the void inducing member is penetrated by the application of gas pressure, and fine bubble which function as a void nucleus is induced into the part near the top end. The void nucleus expands to a void which becomes larger in response to the volumetric shrinkage of the resin during the cooling and solidification step. Consequently, the part has an excellent surface appearance free from sink marks. This occurs even when the part has a complicated configuration comprising both very thick and thin wall portions.

According to the present invention, a part of good quality, free from sink marks can be obtained while omitting the dwelling step. It is possible to use a molding machine having a smaller clamping force, as compared with conventional injection molding methods where injection and dwelling are performed at high pressure to inhibit the formation of sink marks. In this regard, there is also the advantage that molded in stresses in the part can be suppressed. In addition, the formation of the void is not accompanied with the unnatural circulation of the resin, e.g. the extrusion of an unsolidified resin from the center of the thick wall portion, to form the hollow portion in the thick wall. Consequently, the injection molding process is performed quite easily without the necessity of a special high-pressure gas source which is difficult to handle.

While the preferred embodiment of the present invention has been shown and described, it is to be understood that these disclosures are for the purpose of illustration and that various changes and modifications may be made without deviating from the scope of the invention as set forth in the appended claims.

What is claimed is:

1. An injection molding method for manufacturing a thermoplastic part having thick and thin wall portions and having a surface appearance which is free from sink marks, and method comprising the steps of:

provided at least one void inducing member having an acute top end at a position corresponding to each thick wall portion of the part such that the acute top end is located in a cavity of the mold;

injecting a molten resin in an amount sufficient to fill the cavity of the mold;

supplying compressed gas at a predetermined pressure along a periphery of the at least one void inducing member to the acute top end, wherein a resin skin layer formed in contact with the top end of the void inducing member is penetrated by said compressed gas, and a fine bubble serving as a void nucleus is induced in the molten resin; and cooling and solidifying the resin, wherein said void nucleus is expanded to a large void in response to volumetric shrinkage of the resin by the shrinkage force of the resin during the step of cooling and solidifying.

2. The injection molding method according to claim 1, wherein the gas pressure is applied after a delay period wherein the injected resin is dwelled.

3. The injection molding method according to claim 1, wherein the application of gas pressure is stopped at a predetermined time before the end of the cooling step, and then the resin is continuously cooled while it is exposed to the atmosphere.

4. The injection molding method according to claim 1, wherein the gas pressure is applied by supplying compressed gas at a pressure of from 5 to 15 kg/cm$^2$.

* * * * *